(12) United States Patent
Krishnamacharya (10) Patent No.: US 11,226,994 B2
(45) Date of Patent: Jan. 18, 2022

(54) MODIFYING DATA STRUCTURES TO INDICATE DERIVED RELATIONSHIPS AMONG ENTITY DATA OBJECTS

(71) Applicant: EQUIFAX, INC., Atlanta, GA (US)

(72) Inventor: Sri Krishnamacharya, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 657 days.

(21) Appl. No.: 15/739,535

(22) PCT Filed: Jul. 6, 2016

(86) PCT No.: PCT/US2016/041089
§ 371 (c)(1),
(2) Date: Dec. 22, 2017

(87) PCT Pub. No.: WO2017/007810
PCT Pub. Date: Jan. 12, 2017

(65) Prior Publication Data
US 2018/0173790 A1    Jun. 21, 2018

Related U.S. Application Data

(60) Provisional application No. 62/188,862, filed on Jul. 6, 2015.

(51) Int. Cl.
*G06F 16/28* (2019.01)
*G06F 16/22* (2019.01)
(Continued)

(52) U.S. Cl.
CPC ........ *G06F 16/288* (2019.01); *G06F 16/2272* (2019.01); *G06F 16/2379* (2019.01); *G06F 16/24* (2019.01); *H04L 63/08* (2013.01)

(58) Field of Classification Search
CPC ............... G06F 16/288; G06F 16/2379; G06F 16/2272; G06F 16/24; H04L 63/08
(Continued)

(56) References Cited

U.S. PATENT DOCUMENTS 7,630,973 B2   12/2009   Black et al.
7,941,449 B2    5/2011   Liu et al.
(Continued)

OTHER PUBLICATIONS

European Patent Application No. 16821905.3, Extended European Search Report dated Jan. 30, 2019, 10 pages.
(Continued)

*Primary Examiner* — Hosain T Alam
*Assistant Examiner* — Nicholas E Allen
(74) *Attorney, Agent, or Firm* — Kilpatrick Townsend & Stockton LLP (57) ABSTRACT

In some aspects, an interconnectivity evaluation system identifies, in a data structure with data indicating links among entity data objects, first links between a first entity data object and additional entity data objects and second links between a second entity data object and the additional entity data objects. A connectivity score for the first and second entity data objects, which indicates a weight of a relationship between the first and second entity data objects, is computed based on the first links and the second links. Data in the data structure is modified to indicate a relationship between the first and second entity data objects. The relationship is associated with the computed connectivity score. If a difference between the connectivity score and a desired connectivity score exceeds a threshold, a recommendation is outputted to modify the connectivity score by changing at least some of the links among the entity data objects.

20 Claims, 4 Drawing Sheets

(51) Int. Cl.
*G06F 16/23* (2019.01)
*G06F 16/24* (2019.01)
*H04L 29/06* (2006.01)

(58) Field of Classification Search
USPC .................................................... 707/741
See application file for complete search history.

(56) References Cited

U.S. PATENT DOCUMENTS

| | | | | |
|---|---|---|---|---|
| 9,064,274 B2* | 6/2015 | Margines | ........... | G06Q 30/0276 |
| 2012/0185480 A1* | 7/2012 | Ni | ........... | G06F 16/355 |
| | | | | 707/737 |
| 2012/0221561 A1 | 8/2012 | Brown et al. | | |
| 2012/0226590 A1 | 9/2012 | Love et al. | | |
| 2013/0239185 A1* | 9/2013 | Orttung | ........... | G06F 21/40 |
| | | | | 726/5 |
| 2014/0258975 A1* | 9/2014 | Bolotnikoff | ........... | G06F 8/70 |
| | | | | 717/120 |
| 2014/0279797 A1* | 9/2014 | Dang | ........... | G06N 5/025 |
| | | | | 706/47 |
| 2014/0280044 A1* | 9/2014 | Huynh | ........... | G06F 16/3323 |
| | | | | 707/722 |
| 2014/0280224 A1* | 9/2014 | Feinberg | ........... | G06F 16/9024 |
| | | | | 707/748 |
| 2015/0006501 A1* | 1/2015 | Talmon | ........... | G06F 16/9024 |
| | | | | 707/708 |
| 2015/0006582 A1* | 1/2015 | Briere | ........... | G06Q 10/10 |
| | | | | 707/784 |
| 2015/0100522 A1* | 4/2015 | Chung | ........... | G06F 16/367 |
| | | | | 706/11 |
| 2015/0106361 A1* | 4/2015 | Shah | ........... | G06Q 50/01 |
| | | | | 707/723 |
| 2015/0169579 A1* | 6/2015 | Connor | ........... | G06F 16/90335 |
| | | | | 707/749 |

OTHER PUBLICATIONS

International Patent Application No. PCT/US2016/041089, "International Search Report and Written Opinion", dated Oct. 21, 2016, 11 pages.
EP16821905.3, "Office Action", dated Feb. 11, 2020, 7 pages.
Indian Patent Application No. 201817003961, "First Examination Report", dated Jan. 28, 2021, 7 pages.

* cited by examiner

| Tradelines | | | | | |
|---|---|---|---|---|---|
| | 108a | 108b | 108c | 108d | 108e |
| 108a | - | 17 | 0 | 26 | 22 |
| 108b | 17 | - | 100 | 113 | 263 |
| 108c | 0 | 100 | - | 0 | 64 |
| 108d | 36 | 113 | 0 | - | 6 |
| 108e | 22 | 263 | 64 | 6 | - |

FIG. 5

| Connectivity Scores | | | | | |
|---|---|---|---|---|---|
| | 108a | 108b | 108c | 108d | 108e |
| 108a | - | 23.56% | 2.40% | 29.87% | 36.50% |
| 108b | 5.78% | - | 29.76% | 25.43% | 43.56% |
| 108c | 6.98% | 50.67% | - | 10.99% | 33.99% |
| 108d | 29.87% | 39.22% | 20.77% | - | 26.70% |
| 108e | 10.67% | 49.87% | 25.78% | 20.76% | - |

MODIFYING DATA STRUCTURES TO INDICATE DERIVED RELATIONSHIPS AMONG ENTITY DATA OBJECTS

CROSS-REFERENCE TO RELATED APPLICATIONS

This disclosure is a U.S. national phase under 35 U.S.C. 371 of International Patent Application No. PCT/US2016/041089, entitled "Modifying Data Structures to Indicate Derived Relationships Among Entity Data Objects" and filed Jul. 6, 2016, which claims priority to U.S. Provisional Application No. 62/188,862, entitled "Evaluating Interconnectivity Among Entities Involved in Market Transactions," filed Jul. 6, 2015, the entirety of each of which is hereby incorporated by reference herein.

TECHNICAL FIELD

This disclosure relates generally to data structure for analyzing relationships among entities, and more particularly relates to updating data structures to accurately reflect, among data objects representing entities, interconnectivity among the entities for assessing risks and other attributes of entity relationships.

BACKGROUND

Databases and other data structures may be used to identify relationships between different individuals, organizations, businesses, or other logical entities. In a simplified example, a database may include information about a set of businesses. The database may include a table for each business. Within each table, the database can include rows that identify different trade lines or other business relationships between the business and other businesses. This database allows a user to identify certain data objects (e.g., tables), which represent business entities and the relationships among these data objects, which represent transactions or other associations among the businesses.

But existing data structures for representing activities and characteristics of certain entities may not account for certain interconnections among entities. For example, when relating one data object representing a first entity to a second data object representing a second data entity, a data structure may be limited to using data that explicitly identifies both the first and second entities (e.g., data describing the first entity's debts and assets). Risk assessments that use this data structure may fail to focus on a wider network of interconnections between the first entity and other entities, such as indirect relationships between the first entity and other entities.

Thus, prior data structures may be limited to relating data objects, which represent entities, based only on explicitly identified relationships (e.g., creditor-debtor relationships). These data structures fail to account for other ways in which different entities may be interconnected (e.g., the indirect relationships described above). This deficiency of current data structures may result in inaccurate risk assessments with respect to related entities.

SUMMARY

Aspects and examples are disclosed for modifying data structures to describe derived relationships among entity data objects and thereby representing interconnectivity among groups of entities. In some aspects, an interconnectivity evaluation system identifies, in a data structure with data indicating links among entity data objects, first links between a first entity data object and additional entity data objects and second links between a second entity data object and the additional entity data objects. A connectivity score for the first and second entity data objects, which indicates a weight of a relationship between the first and second entity data objects, is computed based on the first links and the second links. Data in the data structure is modified to indicate a relationship between the first and second entity data objects. The relationship is associated with the computed connectivity score. If a difference between the connectivity score and a desired connectivity score exceeds a threshold, a recommendation is outputted to modify the connectivity score by changing at least some of the links among the entity data objects.

This illustrative example is mentioned not to limit or define the invention, but to aid understanding thereof. Other aspects, advantages, and features will become apparent after review of the entire description and figures, including the following sections: Brief Description of the Figures, Detailed Description, and Claims.

BRIEF DESCRIPTION OF THE FIGURES

These and other features, aspects, and advantages of the present disclosure are better understood when the following Detailed Description is read with reference to the accompanying drawings.

DETAILED DESCRIPTION

This disclosure describes modifying databases and other data structures to include derived relationships among data objects that represent entities (e.g., individuals, organizations, etc.). Derived relationships can include, for example, relationships that are determined based on a connectivity score for groups of entity data objects, and that can encompass indirect relationships among entity data objects. A connectivity score can be computed based on analyzing data that describes explicit links among groups of entity data objects in the data structure and identifying both direct and indirect relationships that interconnect the entity data objects.

In some aspects, an interconnectivity evaluation module executed by a processing device can determine connectivity scores for a target entity based on a network of explicit links described by data in a data structure. For instance, a database or other data structure can include entity data objects, which include data describing entities, and entity connection data, which describes or otherwise indicates explicit links between different entities (e.g., trade lines between different businesses). The links in the network of entities can be analyzed to identify derived relationships (e.g., non-zero connectivity scores) among entity data objects, even if no explicit link between the data objects (e.g., a trade line) is identified in the data structure.

In a simplified example, entity data objects may represent businesses, and entity connection data can describe trade lines between the businesses. Prior to computing connectivity scores, the data structure may only identify entity data objects as being associated with one another if the entity connection data identifies trade lines or other explicit links between them. The interconnectivity evaluation module can compute a connectivity score for a target entity and a selected related entity using (i) a number of trade lines that exist between the target entity and other related entities and (ii) a number of trade lines that exist between the selected related entity and the other related entities. The connectivity score can indicate the weight of a relationship between two entity data objects. The weight can represent the degree to which impacts on a first entity can affect the operations of a second entity. The interconnectivity evaluation module can update the data structure to reflect a derived relationship between two entities, where the derived relationship corresponds to the computed connectivity score.

In some aspects, computed connectivity scores can be used to generate suggestions for assessing risk associated with interconnections represented by the derived relationships and associated connectivity scores. For example, the interconnectivity evaluation module can determine, based on analyzing entity data objects and entity connection data, that a first entity, such as a consumer of products or services, and a second entity, such as a supplier of products or service, have one or more trade lines with one another or are otherwise involved in the same supply chain. The interconnectivity evaluation module can compute a connectivity score for the consumer entity with respect to the supplier entity. The interconnectivity evaluation module can determine whether the connectivity score is above a threshold. A connectivity score above the threshold may indicate that negative impacts on the supplier entity will be highly disruptive to the consumer entity. The interconnectivity evaluation module can generate one or more suggestions based on the connectivity score exceeding a threshold. In one example, the interconnectivity evaluation module can transmit a notification indicating that the consumer entity should monitor risk indicators for the supplier entity. In another example, the interconnectivity evaluation module can transmit a notification indicating that the consumer entity should modify or diversify the supplier entities used to obtain the product or service.

The features discussed herein are not limited to any particular hardware architecture or configuration. A computing device can include any suitable arrangement of components that provide a result conditioned on one or more inputs. Suitable computing devices include multipurpose, microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Figure 1:
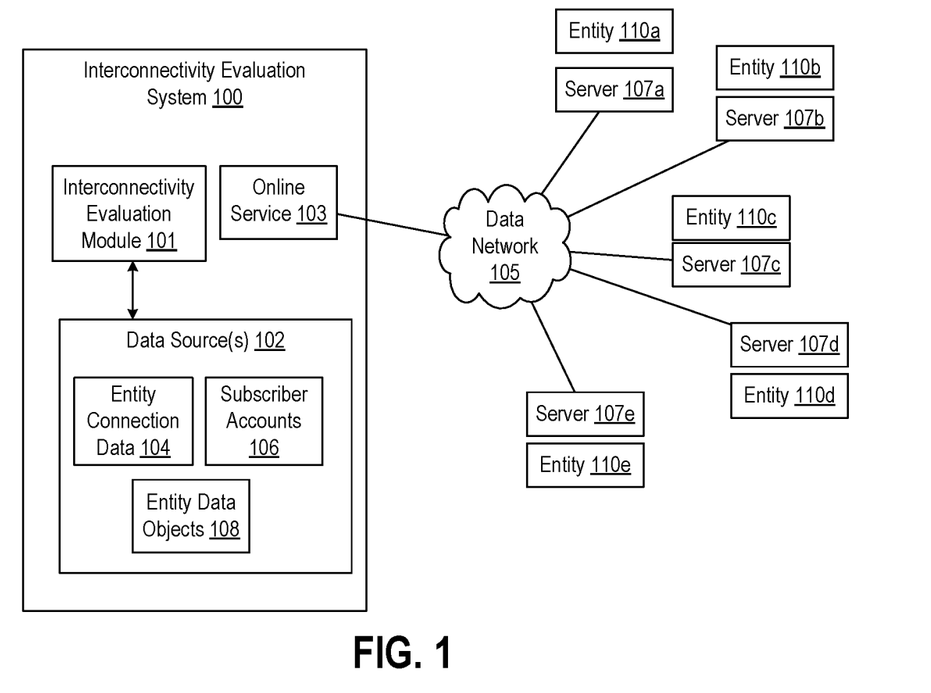
FIG. 1 depicts an example of an interconnectivity evaluation system that can be used to update data structures to accurately reflect interconnectivity among a set of entity data objects, according to some aspects of the present disclosure.

Referring now to the drawings, FIG. 1 is a block diagram illustrating an example of an interconnectivity evaluation system 100 that can be used to update data structures to accurately reflect interconnectivity among a set of entity data objects 108a-e. A network of entities can include, for example, a set of individuals, companies, or other logical entities and the relationships via which different entities provide services or products to one another. In some aspects, the entities 110a-e can include interconnected suppliers of products or services, consumers of products or services, or some combination thereof.

The interconnectivity evaluation system 100 is a computing device or group of computing devices configured to execute an interconnectivity evaluation module 101. The interconnectivity evaluation system 100 can be communicatively coupled to servers 107a-e that are associated with respective entities 110a-e. The interconnectivity evaluation module 101 can include executable instructions for accessing data source 102 and using data objects representing the various entities 110a-e to determine interconnectivities among the entities 110a-e. These determined interconnectivities can be used, for example, to identify risks associated with connections between different entities or groups of entities in a network of entities.

The interconnectivity evaluation module 101 can access data stored data sources 102. The data sources 102 can include databases or other data structures stored in a non-transitory computer-readable medium that is accessible to the interconnectivity evaluation module 101. The data can include entity connection data 104, such as (but not limited to) trade line data, subscriber accounts 106, and entity data objects 108. In some aspects, the interconnectivity evaluation module 101 can generate one or more of the entity connection data 104, the subscriber accounts 106, and the entity data objects 108 based on communications with the servers 107a-e.

In one example, the interconnectivity evaluation module 101 receives the entity connection data 104, the subscriber accounts 106, or the entity data objects 108 from one or more of the servers 107a-e and generates a copy of this data in a non-transitory computer-readable medium of the interconnectivity evaluation system 100. In another example, the interconnectivity evaluation module 101 receives other communications from one or more of the servers 107a-e and generates the entity connection data 104, the subscriber accounts 106, or the entity data objects 108 from this received data. Examples of this data include transaction data describing electronic transactions among at least some of the entities 110a-e.

The interconnectivity evaluation module 101 can generate, analyze, or otherwise use the entity connection data 104 and entity data objects 108, as stored in one or more data structures of a non-transitory computer-readable medium, to update data structures to accurately reflect interconnectivity among a set of entity data objects 108a-e. Each entity data object 108 can represent a given one of the entities 110a-e or a given subset of the entities 110a-e. An entity data object can be any suitable data structure or collection of data structures having data that uniquely identifies a particular entity. Examples of entity data objects include (but are not limited to) databases, database records, tables, table rows, nodes of a data graph, etc. The entity connection data 104 can indicate how different entities are connected with one another. The entity connection data 104 can be any suitable data structure or collection of data structures for storing data describing associations or transactions between groups of entities. Examples of suitable data structures for entity connection data 104 include databases, tables, data graphs, etc. The interconnectivity evaluation module 101 can use the entity connection data 104 and the entity data objects 108 to generate or analyze a virtual model of the network of entities 110a-e.

In some aspects, entities may be connected via business relationships between different entities. These business relationships can be identified using the entity connection data 104. A first example of a business relationship identified by entity connection data 104 is a debtor-creditor relationship. For instance, if entity 110a is a creditor of the entity 110b, the entity connection data 104 can include a record identifying the business credit account held by the entity 110b with respect to the entity 110a. A second example of a business relationship identified by the entity connection data 104 is a financial services relationship. For instance, if entity 110c is responsible for managing investments on behalf of the entity 110b, the entity connection data 104 can include a record identifying the investment account held by the entity 110b with respect to the entity 110c. A third example of a business relationship identified by the entity connection data 104 is a banking services relationship. For instance, if entity 110d is a banking institution with which entity 110e has an account, the entity connection data 104 can include a record identifying the investment account held by the entity 110e with respect to the entity 110d. (These examples of entity connection data 104 are provided for illustrative purposes only; other types of business relationships in which a first entity provides products or services to a second entity can be described by the entity connection data 104.)

The subscriber accounts 106 can be stored in, for example, a database or other suitable data source. The subscriber accounts 106 can include data regarding respective entities that are subscribers to an online service 103. In some aspects, the online service 103 can be a separate service that is executed by the interconnectivity evaluation system 100 and that is accessible by the interconnectivity evaluation module 101. In other aspects, the online service 103 can be integrated with the interconnectivity evaluation module 101.

The data included in the subscriber accounts 106 can be received from one or more computing systems associated with one or more of the entities 110a-e. In some aspects, an online service 103 that includes or is accessible to the interconnectivity evaluation module 101 can verify at least some of the data received from entities by comparison with data received from external sources, transactional data collected by the online service 103, or other data sources. In some aspects, a subscriber entity may populate the subscriber account by instructing or otherwise permitting the online service 103 to extract or otherwise access the relevant subscriber data from other services or databases.

The data sources 102 can include, for example, secure and credentialed databases accessible to the interconnectivity evaluation system 100. The data sources 102 can include internal databases or other data sources that are stored at or otherwise accessible to the computing system. The data sources 102 can also include external databases that are accessible via external networks. Non-limiting examples of data stored in the data sources include verified credit data, verified tax data, verified asset data (e.g., property records or verified data regarding other assets possessed by a client), and other types of verified subscriber information.

In some aspects, the data sources 102 (which may include internal or external databases) may be data storage devices controlled, at least in part, by one or more users of the interconnectivity evaluation module 101. The data sources 102 can be updated periodically or continuously. In other aspects, the internal or external databases are controlled by an entity other than the users of the interconnectivity evaluation module 101.

The interconnectivity evaluation system 100 can electronically communicate with one or more servers 107a-e that are associated with the entities 110a-e via one or more data networks 105. For example, an online service 103 that includes or is accessible to the interconnectivity evaluation module 101 can receive requests from one or more of the entities 110a-e to establish one or more subscriber accounts 106. The online service 103 can establish the subscriber accounts by storing authentication information (e.g., user names, passwords, etc.) that can be used to authenticate one or more of the entities 110a-e. Subsequent to establishing the subscriber accounts, the online service 103 that includes the interconnectivity evaluation module 101 can authenticate one or more users representing one or more of the entities 110a-e.

If the users are properly authenticated, the online service 103 can receive at least some of the entity connection data 104 of one or more entities 110a-e from the users. For example, a user of an entity 110b that is a creditor of the entity 110a can log into the online service 103 with appropriate authentication information and transmit data indicating that another entity 110a has established a business credit line with the entity 110b. The online service 103 can generate or modify a record in the entity connection data 104 that describes or otherwise indicates the established business credit line between the entities 110a and 110b.

In some aspects, the interconnectivity evaluation module 101 can include or communicate with one or more of a web server module, a web services module, and an enterprise services module. For example, a web server module can be executed by a suitable processing device to provide one or more web pages or other interfaces to a client system operated by one of the entities. The web services module can generate this content by executing one or more analytical algorithms using information retrieved from one or more of the data sources. The enterprise services module can be executed to retrieve the information from one or more of the data sources accessible by the interconnectivity evaluation module 101.

Figure 2:
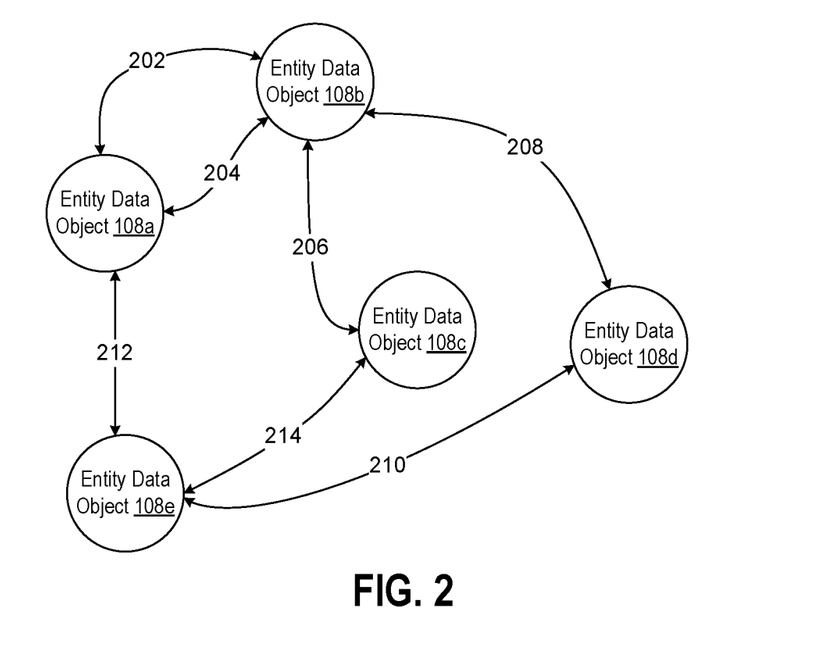
FIG. 2 depicts an example of the interconnectivity of the entities depicted in FIG. 1, according to some aspects of the present disclosure.

FIG. 2 is a block diagram illustrating an example of the interconnectivity of entities 110a-e. In some aspects, the interconnectivity evaluation system 100 can generate or otherwise a data structure representing a group of entities 110a-e by using entity data objects 108 representing the entities 110a-e and entity connection data representing links (e.g., trade lines) between pairs of the entities 110a-e. In the example depicted in FIG. 2, the entities 110a-e can be related to one another via trade lines 202, 204, 206, 208, 210, 212, and 214. Each trade line, which can be identified by the interconnectivity evaluation module 101 from the entity connection data 104 depicted in FIG. 1, represents a link between entities in which one of the entities provides products or services (e.g., credit lines, banking services, manufacturing services, etc.) that are consumed or otherwise used by another entity.

An entity can be linked to one or more other entities by more than one trade line. Different trade lines may represent different accounts, services, products, or other business or legal relationships between different entities. In one example, a first entity 110a may rely on a second entity 110b for banking services, as represented by the trade line 202, and investment services, as represented by the trade line 204. In another example, a first entity 110a may have two separate credit accounts with a second entity 110b. The trade lines 202 and 204 can represent these credit accounts.

Entities may be directly or indirectly connected via the links described in the entity connection data. Directly connected entities can be entities that provide products or services to one another. For example, the entity 110a is directly connected to the entity 110b via the trade lines 202 and 204 and to the entity 110e via the trade line 212. Indirectly connected entities can be entities that provide products or services to another common entity, receive products or services from the common entity, or some combination thereof. For example, the entity 110a may rely on a second entity 110b for both banking services and investment services, as represented by the trade lines 202 and 204. The entity 110c may receive banking services from the entity 110b, as represented by the trade line 206, and the entity 110d may receive financial services from the entity 110b, as represented by the trade line 208. In this manner, the entities 110a, 110c, 110d are interconnected.

In some aspects, entities may be connected to other entities through both direct and indirect connections. For example, the entities 110a and 110e depicted in FIG. 2 are directly connected (e.g., by exchanging products or services), as represented by the trade line 212. The entities 110a and 110e are also indirectly connected via the trade lines 202 and 204 between the entities 110a and 110b, the trade lines 206 and 208 between the entity 110b and the entities 110c and 110d, and the trade lines 214 and 210 between the entity 110e and the entities 110c and 110d.

The number of entities and trade lines depicted in FIGS. 1 and 2 are depicted for illustrative purposes only. However, any number of interconnected entities and trade lines can be evaluated using the interconnectivity evaluation module 101.

In some aspects, the interconnectivity evaluation system 100 described herein can be used for evaluating risks associated with a network of entities, as this risk mitigation may involve understanding of the inter-relationships between or among these entities than is available with existing solutions. In a simplified example, multiple entities involved in manufacturing certain products may be interconnected with one another. For instance, a first entity involved in a system for manufacturing products may be a consumer of certain raw materials supplied by a second entity and a debtor of a third entity. Even though the second entity has no direct business relationship with the third entity, a negative impact on the second entity (e.g., a bankruptcy) may negatively impact the first entity. This negative impact may be, for example, a bankruptcy or other change in the second entity's financial position that affects the ability of the second entity to provide materials used in a manufacturing process by the first entity, which in turn disrupts the first entity's operations and decreases the financial ability of the first entity to service its debt to the third entity. In this manner, the different entities are interconnected.

Existing solutions for evaluating interconnectivity among networks of entities may be insufficient for accurately analyzing the effect of these interconnections between entities. For example, prior solutions may focus on a given company's debts and assets when evaluating risks involved with entering into a market transaction with the company. This focus on the company, rather than a wider network of interconnections affecting the company, may fail to account for the company's influence on other entities in the network, or vice versa. This failure may result in inaccurate risk assessments with respect to transactions among entities (e.g., supply chains, market transactions, provision of online services) involving the company.

In some aspects, evaluating interconnectivity among entities can involve evaluating the degree to which impacts (e.g., changes in financial position such as profit losses, bankruptcies, etc.) to a business or other entity will impact related businesses or entities (e.g., other business partners, creditors, etc.). The interconnectivity evaluation module 101, when executed by a processing device, can determine connectivity scores for a target entity based on a network of relationships between the target entity and related entities. For example, a connectivity score for the target entity and a selected related entity can be computed using (i) a number of trade lines that exist between the target entity and the selected related entity, (ii) a number of trade lines that exist between the target entity and other related entities, and (iii) a number of trade lines that exist between the selected related entity and the other related entities.

The connectivity score can be provided to the target entity or another entity that may enter into a new business relationship or other type of connection with the target entity. In one example, a high connectivity score between a target entity and one or more other entities can indicate that a positive or negative impact on the target entity may have a respective disruption on the larger networks of entities. In another example, a high connectivity score between a target entity and one or more other entities can indicate that a business relationship with the target entity may be an advantageous business opportunity.

In some aspects, computed connectivity scores can be used to generate suggestions for assessing modifying trade lines. For example, the interconnectivity evaluation module 101 can determine that a first entity (e.g., a consumer of products or services) and a second entity (e.g., a supplier of products or service) have one or more trade lines with one another or are otherwise involved in the same supply chain. The interconnectivity evaluation module 101 can compute a connectivity score for the consumer entity with respect to the supplier entity. The interconnectivity evaluation module 101 can determine whether a difference between the connectivity score and a desired connectivity score exceeds a threshold. In one example, a computed connectivity score that is above a desired connectivity score or outside a range of desired connectivity scores may indicate that negative impacts on the supplier entity will be highly disruptive to the consumer entity. In another example, a computed connectivity score that is below a desired connectivity score may otherwise indicate that a business relationship with the supplier entity would be undesirable.

The interconnectivity evaluation module 101 can generate one or more suggestions based on the difference between the connectivity score and the desired connectivity score exceeding the threshold. In one example, the interconnectivity evaluation module 101 can configure a suitable output device (e.g., a network interface device, a display device, etc.) to transmit a notification indicating that the consumer entity should monitor risk indicators for the supplier entity. In another example, the interconnectivity evaluation module 101 can configure a suitable output device to transmit a notification indicating that the consumer entity should modify or diversify the supplier entities used to obtain the product or service.

In some aspects, the interconnectivity evaluation system described herein can provide improvements over existing computer-implemented interconnectivity evaluation solutions. Existing solutions for evaluating interconnectivity a network of entities may fail to identify risks that result from indirect connections between entities. For example, existing solutions may be limited to analyzing a given entity's debts and assets rather than the entity's influence on other entities in the network, or vice versa. This failure may result in inaccurate risk assessments with respect to transactions among entities. The interconnectivity evaluation system according to some examples can evaluate interconnectivity among a wider network of entities using a particular collection of computing assets (e.g., network connections with multiple servers associated with entities, a non-transitory computer-readable medium storing large amounts of transaction and other entity-connection data from the servers via an online service, and an interconnectivity module executed on one or more processing devices), which may result in more accurate risk assessments. The operations described herein for interconnectivity evaluation can improve the performance of a computer system performing interconnectivity evaluation as compared to existing solutions.

Figure 3:
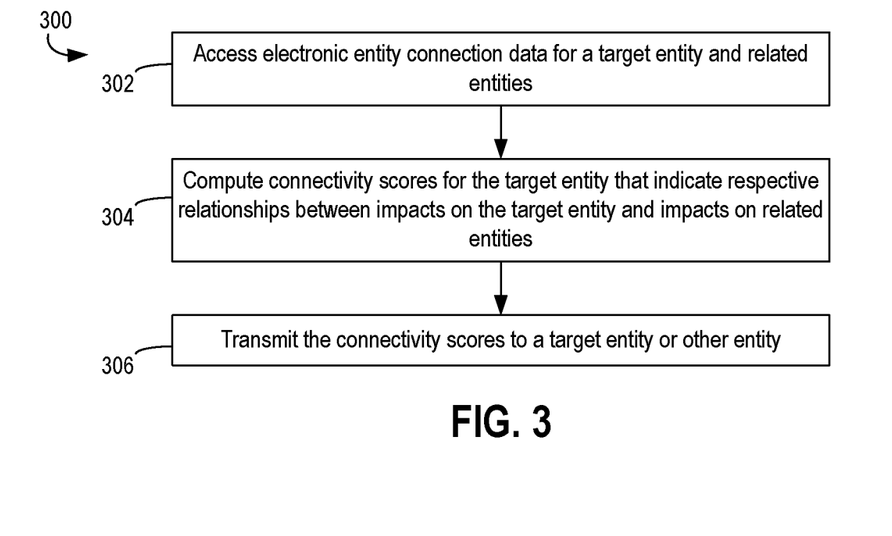
FIG. 3 depicts an example of a process for evaluating interconnectivity among a network of entities, according to some aspects of the present disclosure.

The interconnectivity evaluation module 101 can execute one or more algorithms for identifying and evaluating the interconnectivity among the entities 110a-e. FIG. 3 is a flow chart illustrating an example of a process 300 for evaluating interconnectivity among entities involved in market transactions according to some aspects. For illustrative purposes, the process 300 is described with reference to the implementation depicted in FIGS. 1 and 2. Other implementations, however, are possible.

The process 300 can involve accessing electronic entity connection data for a target entity and related entities, as depicted in block 302. For example, the interconnectivity evaluation module 101 can be executed by a suitable processing device to perform one or more operations suitable for implementing block 302. The operations may include retrieving or otherwise accessing a database or other suitable data structure stored in a non-transitory computer-readable medium that includes the electronic entity connection data. In one example, the electronic entity connection data can describe or otherwise indicate trade lines between the target entity and related entities.

Figure 4:
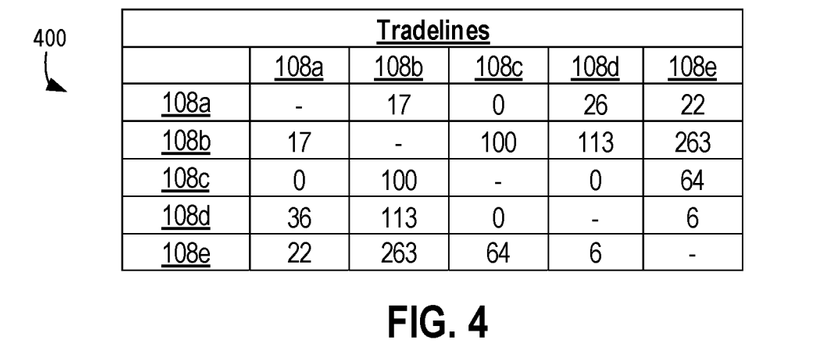
FIG. 4 depicts an example of trade lines linking different interconnected entities, according to some aspects of the present disclosure.

In some aspects, the electronic data includes information about trade lines between different entities. FIG. 4 is a chart 400 illustrating an example of trade lines among different interconnected entities 110a-e. Each row identifies the trade lines between a given entity and each other entity. For example, as depicted in FIG. 4, the entity 110a has 17 trade lines with the entity 110b, 0 trade lines with the entity 110c, 26 trade lines with the entity 110d, and 22 trade lines with the entity 110e.

The process 300 can also involve computing connectivity scores for the target entity that indicate respective relationships between impacts (e.g., changes in financial position) on the target entity and impacts on related entities, as depicted in block 304. For example, the interconnectivity evaluation module 101 can be executed by a suitable processing device to perform one or more operations suitable for implementing block 304.

In some aspects, the operations for computing a connectivity score can include identifying a degree of direct connectivity between a first entity (i.e., the target entity) and a second entity, identifying degrees of connectivity between the first entity and additional entities other than the second entity (e.g., additional businesses with which the first entity has trade lines), and weighting the degrees of connectivity between the first entities and the additional entities based on connectivity between the second entity and the additional entities.

For example, the processing device can compute a connectivity score for a target entity 110a and a related entity 110b. The processing device can access data received from various external data sources that identify trade lines involving the target entity 110a and the related entity 110b. The processing device can compute a ratio of (i) a number of trade lines between the target entity 110a and the related entity 110b and (ii) a total number of trade lines involving the target entity 110a. The computed ratio can represent the direct connectivity between the target entity 110a and the related entity 110b. The processing device can also compute, for each of the additional entities 110c-e, a ratio of trade lines between the target entity 110a and the additional entity. The processing device can also compute weights to be applied to the ratios between the target entity 110a and the additional entities 110c-e. The weights can represent degrees of interconnectivity between third-party entities, the target entity 110a, and the related entity 110b. For example, the weights for the weighted sum can be computed from a first set of connectivity scores between the target entity 110a and the other entities 110c-e and a second set of connectivity scores between the related entity 110b and the other entities 110c-e.

In one example, the interconnectivity evaluation module 101 can compute a connectivity score $d_{ij}$ for the $i^{th}$ entity with respect to the $j^{th}$ entity of n entities using the following formula:

$$d_{ij} = \frac{t_{ij}}{T_i} + \sum_{\substack{k \neq j \\ k \neq i}}^{n} \left(\frac{t_{ik}}{T_i}\right) \times d_{kj} \times d_{ik}.$$

The variable $t_{ij}$ represents a number of trade lines between the $i^{th}$ entity and the $j^{th}$ entity. The variable $t_{ik}$ represents a number of trade lines between the $i^{th}$ entity and another $k^{th}$ entity. The variable $T_i$ represents a total number of trade lines involving the $i^{th}$ entity. The variable $d_{kj}$ represents a connectivity score of the $k^{th}$ entity with respect to the $j^{th}$ entity, and the variable $d_{ik}$ represents a connectivity score of the $i^{th}$ entity with respect to the $k^{th}$ entity. The connectivity score $d_{ij}$ can be recursively computed.

In additional or alternative aspects, other data describing relationships between entities can be used to compute connectivity scores. For example, different trade lines may involve different amounts of money, and other business relationships (e.g., supplier-consumer relationships) may involve other quantifiable attributes associated with the business relationships. These quantifiable attributes can be used to compute the various weights described above. Non-limiting examples of other quantifiable attributes include the total business value of a set of trade lines between two entities, the total valuation of an entity, the total outstanding account receivables (A/R) of an entity, the outstanding account receivables (A/R) between two entities, and the like. For example, in the process described above, the total business value of a set of trade lines between entity 110a and another entity may be used as an additional factor in calculating the weight applied to the ratio of trade lines between entity 110a and the other entity.

Figure 5:
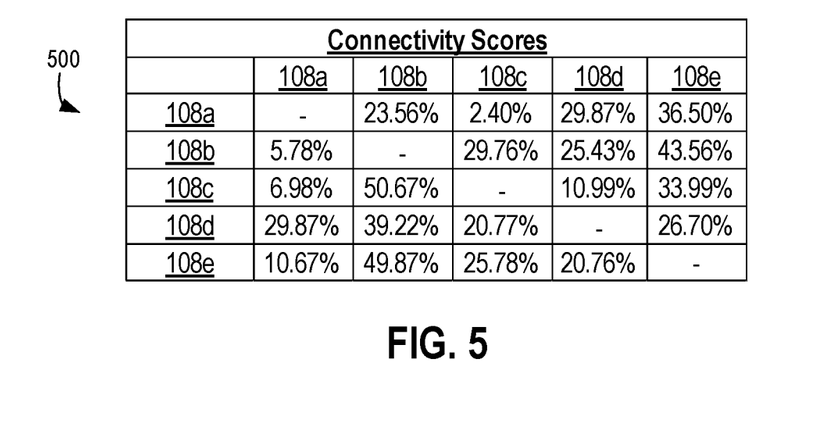
FIG. 5 depicts an example of connectivity scores derived for interconnected entities, according to some aspects of the present disclosure.

An example of computed connectivity scores using the formula above is provided in FIG. 5. FIG. 5 depicts a chart 500 with examples of connectivity scores for interconnected entities 110a-e. The connectivity scores are computed using the formula described above and the numbers of trade lines depicted in FIG. 4.

The process 300 can also involve transmitting the connectivity scores to a target entity or other entity, as depicted in block 306. For example, the interconnectivity evaluation module 101 can be executed by a suitable processing device to perform one or more operations suitable for implementing block 306. In some aspects, the operations may include generating a suitable electronic communication (e.g., an Extensible Markup Language ("XML") document, a web page, an e-mail, etc.) and configuring a network interface device to transmit the electronic communication (e.g., an Extensible Markup Language ("XML") document, a web page, an e-mail, etc.) to one or more computing systems associated with a target entity, an entity that has requested connectivity scores for the target entity, or some other suitable entity the providers. In additional or alternative aspects, the operations may include generating a suitable electronic message and configuring a display device or other output device to output the electronic message (e.g., via a graphical interface) at one or more computing systems.

In some aspects, the interconnectivity evaluation module 101 can be used to update data structures to reflect both explicit links among entities and derived relationships among entities. For example, an explicit link between two entity data objects can be identified by data in a data structure, such as a database, if the entity connection data 104 indicates a trade line or other business relationship between the two entities corresponding to the entity data objects. In the exampled described above with respect to FIG. 2, two explicit links exist between the entity data objects 108a, 108b. The explicit links can be identified and included in the data structure based on entity connection data 104 describing the trade lines 202, 204. Using the examples of connectivity scores depicted in FIG. 4, the entity data object 108a can have explicit links to the entity data objects 108b, 108d, 108e based one or more trade lines being associated with the entity data object 108a and each of the entity data objects 108b, 108d, 108e. Other relationships between entities can also be categorized as explicit links by the interconnectivity evaluation module 101.

A derived relationship between two entity data objects can be determined based on connectivity scores, such as the scores depicted in FIG. 5. For instance, the interconnectivity evaluation module 101 can determine that a derived relationship exists between two entity data objects if the connectivity score for the two entities is above a certain threshold (e.g., a non-zero connectivity score). Using the examples of connectivity scores depicted in FIG. 5, the entity data object 108a can have a derived relationship with each of the entity data objects 108b-e based on the non-zero connectivity scores for each pair of entity data objects.

Figure 6:
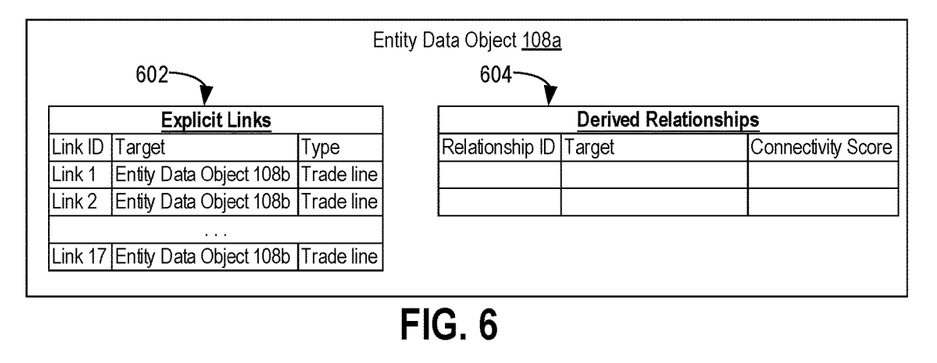
FIG. 6 depicts an example of an entity data object that can indicate both explicit links to other entity data objects and derived relationships with other entity data objects, according to some aspects of the present disclosure.

In some aspects, updating data structures to reflect both explicit links among entities and derived relationships among entities can involve modifying one or more data structures that are included in or associated with an entity data object. For example, in FIG. 6, the entity data object 108a includes tables 602, 604. The table 602 identifies explicit links between the entity data object 108a and one or more other entity data objects. In this example, the table 602 includes records identifying multiple explicit links between the entity data object 108a and the entity data object 108b. These explicit links correspond to different trade lines between the entities that correspond to the entity data objects 108a, 108b.

In this example, the table 604 identifies derived relationships. Prior to the computation of one or more connectivity scores, the table 604 may not reflect any relationship between certain pairs of entity data objects. In the simplified example of FIG. 6, the table 604 is empty, and therefore does not reflect any derived relationship between the entity data object 108a and any other entity data object.

Figure 7:
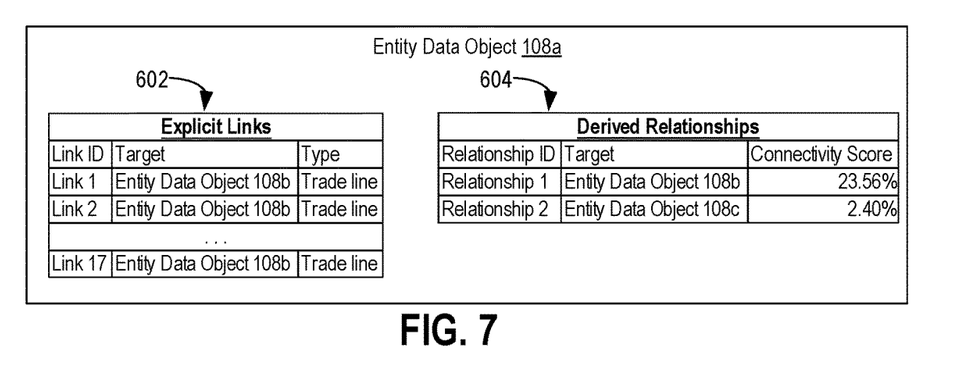
FIG. 7 depicts an example of the entity data object of FIG. 6 after being updated to identify derived relationships with other entity data objects, according to some aspects of the present disclosure.

FIG. 7 depicts an example of the entity data object 108a after being modified to reflect the results of connectivity score computations. In this example, the table 604 is updated to reflect the derived relationships between the entity data object 108a and each of the entity data objects 108b, 108c. For instance, the interconnectivity evaluation module 101 can add data to the table 604 that describes a derived relationship between the entity data objects 108a, 108b, where the derived relationship is added based on the connectivity score of 23.56% being computed for the entity data objects 108a, 108b. The interconnectivity evaluation module 101 can also add data to the table 604 that describes a derived relationship between the entity data objects 108a and 108c, where the derived relationship is added based on the connectivity score of 2.40% being computed for the entity data objects 108a and 108c. In some aspects, the derived relationship can be associated with the computed connectivity scores, as depicted in the example of FIG. 7. Thus, the updated table 604 of the entity data object 108a indicates a derived relationship between the entity data objects 108a, 108c even though no direct link between these objects may exist in the data structure.

Figure 8:
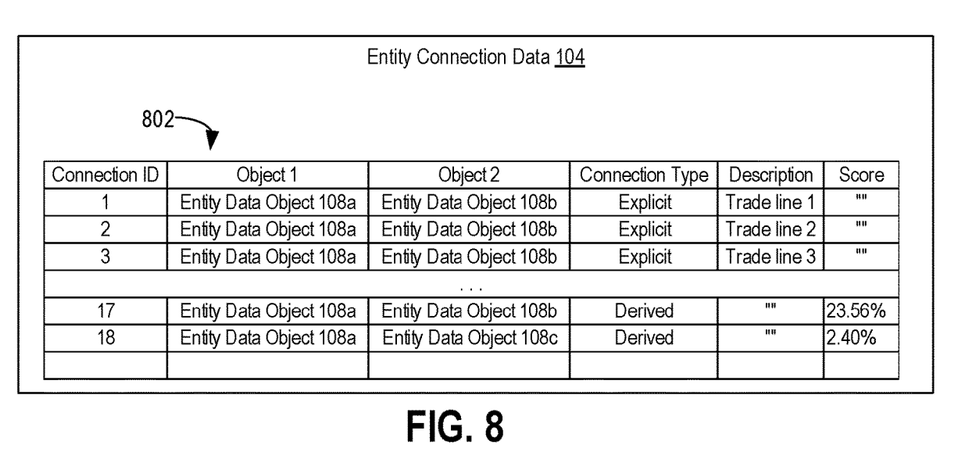
FIG. 8 depicts an example of an entity data object that can indicate both explicit links to other entity data objects and derived relationships with other entity data objects.

In additional or alternative aspects, updating data structures to reflect both explicit links among entities and derived relationships among entities can involve modifying one or more data structures that are included in or associated with entity connection data. For example, in FIG. 8, the entity connection data 104 includes a table 802. The table 802 identifies different types of connections between pairs of entity data objects. The identified connections include explicit links (e.g., links corresponding to various trade lines between the entity data object 108a and the entity data object 108b) and derived relationships (e.g., relationships corresponding to computed connectivity scores for the entity data object 108a and each of the entity data objects 108b, 108c). In the example depicted in FIG. 8, the table 802 has been updated to reflect the derived relationships corresponding to the computed connectivity scores.

Any suitable data structure can be used to store data identifying explicit links and derived relationships between entity data objects. In some aspects, the examples depicted in FIGS. 7-9 can be used separately or in combination. Data structures other than database tables, however, may be used.

Figure 9:
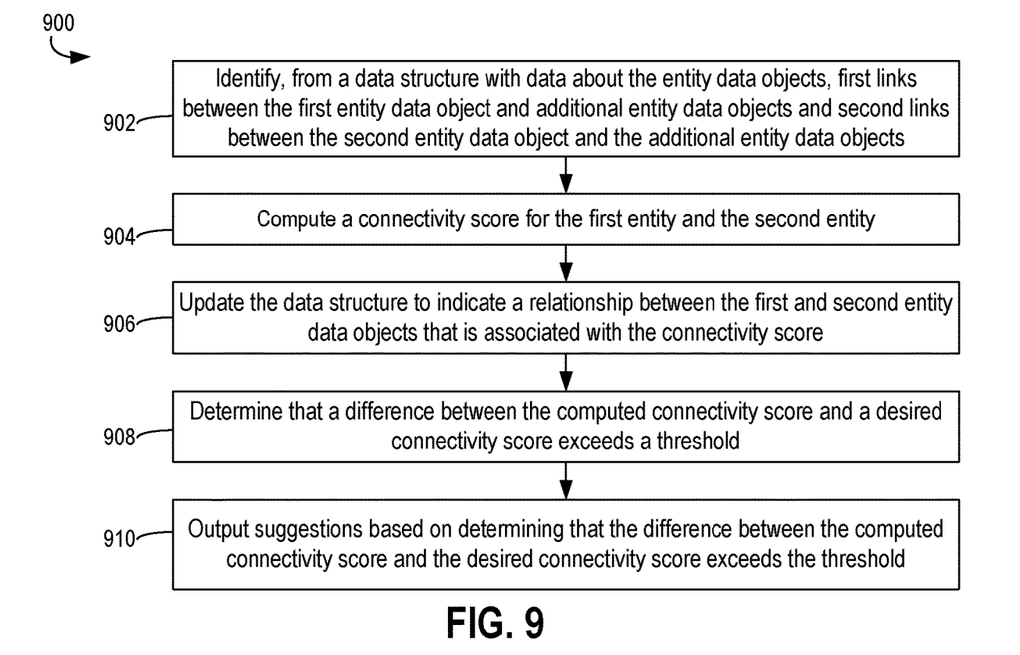
FIG. 9 depicts an example of a process for using computed connectivity scores to generate suggestions for modifying trade lines, according to some aspects of the present disclosure.

In some aspects, the interconnectivity evaluation module 101 can configure the interconnectivity evaluation module 101 to electronically communicate the connectivity score and one or more suggestions for modifying trade lines or other links among entity data objects based on computed connectivity scores. For example, FIG. 9 is a flow chart illustrating an example of a process 900 for using computed connectivity scores to generate suggestions for modifying trade lines or other links among entity data objects. For illustrative purposes, the process 900 is described with reference to the implementation depicted in FIGS. 1-8. Other implementations, however, are possible.

The process 900 can involve identifying, from a data structure with data about the entity data objects, first links between the first entity data object and additional entity data objects and second links between the second entity data object and the additional entity data objects, as depicted in block 902. The interconnectivity evaluation module 101 can be executed by a suitable processing device to perform one or more operations suitable for implementing block 902. In one example, the operations may include accessing electronic data, such as entity data objects and entity connection data, from a database or other suitable data structure. The accessed electronic data can identify, for example, trade lines between different entities that are described by or otherwise correspond to the entity data objects. The interconnectivity evaluation module 101 can identify, from the entity data objects and entity connection data, explicit links such as trade lines between the first entity and additional entities and trade lines between the second entity and the additional entities.

The process 900 can also involve computing a connectivity score for the first entity and the second entity, as depicted in block 904. The interconnectivity evaluation module 101 can be executed by a suitable processing device to perform one or more operations suitable for implementing block 904. In some aspects, the connectivity score can indicate a weight of a relationship between the first entity data object and the second entity data object. An example of a weight of relationship is a degree to which impacts on operations involving the first entity are likely to affect impacts on operations involving the second entity. For instance, the connectivity score may indicate a relationship between a change in the financial position of the first entity and a change in the financial position of the second entity. The operations may include performing one or more of the operations described above with respect to block 304.

The process 900 can also involve updating the data structure to indicate a relationship between the first entity data object and the second entity data object that is associated with the computed connectivity score, as depicted in block 906. The interconnectivity evaluation module 101 can be executed by a suitable processing device to perform one or more operations suitable for implementing block 906. In some aspects, a table or other data structure included in or associated with an entity data object may be updated to indicate a derived relationship between two entity objects. The derived relationship may involve two entity objects with an explicit link or two entity objects without an explicit link.

For instance, in the examples described above with respect to FIGS. 7-9, a data structure that includes one or more of the tables 604, 802 can be updated to add a first derived relationship between entity data objects 108a, 108b. The first derived relationship is added based on the computed connectivity score for entity data objects 108a, 108b. In this example, the data structure that includes one or more of the tables 604, 802 can also be updated to add a second derived relationship between entity data objects 108a, 108c. The second derived relationship is added based on the computed connectivity score for entity data objects 108a, 108c. Derived relationships can be identified between entity data objects even if no explicit link between entity data objects 108a, 108c is otherwise included in the data structure (e.g., in the table 602 that identifies explicit links or in rows of the table 802 that identify explicit connections).

The process 900 can also involve determining that a difference between the computed connectivity score and a desired connectivity score exceeds a threshold, as depicted in block 908. For example, the interconnectivity evaluation module 101 can be executed by a suitable processing device to perform one or more operations suitable for implementing block 908. The operations may include accessing a database or other suitable data structure stored in a computer-readable medium that describes risk profiles or other criteria used for evaluating connectivity scores. The operations may also include comparing the computed connectivity score to one or more desired connectivity scores (e.g., a maximum connectivity score, a minimum connectivity score, a range of acceptable connectivity scores, etc.). The difference between the computed connectivity score and the desired connectivity score may exceed a threshold if the computed connectivity score is greater than a maximum connectivity score, less than a minimum connectivity score, or is otherwise sufficiently different from one or more desired connectivity scores.

The process 900 can also involve outputting suggestions based on determining that the difference between the computed connectivity score and the desired connectivity score exceeds the threshold, as depicted in block 910. For example, the interconnectivity evaluation module 101 can be executed by a suitable processing device to perform one or more operations suitable for implementing block 910. The operations may include generating and transmitting a suitable electronic communication (e.g., an Extensible Markup Language ("XML") document, a web page, an e-mail, etc.) to one or more computing systems associated with the first entity or some other entity that has requested a connectivity score for the first entity with respect to the second entity.

In some aspects, the interconnectivity evaluation module 101 can generate and transmit a notification indicating that the first entity should monitor risk indicators for the second entity. In another example, the interconnectivity evaluation module can transmit a notification indicating that the first entity should replace or supplement the trade line between the first and second entities with another trade line between the first entity and another entity. For example, if the second entity is included in a supply chain that involves the first entity, the notification may include a suggestion to utilize an alternate supply chain that does not include the second entity.

For illustrative purposes, the processes 300 and 900 are described herein using trade lines as examples of connections between entities in a network of entities. But other implementations are possible. Any suitable relationship or other connection among different entities may be used by the interconnectivity evaluation system in the manner described herein.

Although the processes 300 and 900 are described herein with respect to direct connections between entities, other implementations are possible. In some aspects, the interconnectivity evaluation module 101 can be used to evaluate the risk associated with entering into a transaction with an entity that is highly interconnected with other entities.

For example, entity 110a may wish to evaluate the risk involved with entering into a business relationship with the entity 110d. The interconnectivity evaluation module 101 may receive a request from an entity 110a to evaluate the connectivity between the entity 110d and other entities with which the entity 110a has trade lines. The interconnectivity evaluation module 101 may determine that an entity 110d has a high connectivity score with respect to entities 110b and 110e. This high connectivity score may indicate that if entity 110a enters into the relationship with the entity 110d, a negative impact on the entity 110d would negatively affect the entity 110a both directly (e.g., through the trade line between entities 110a and 110d) and indirectly (e.g., through the trade lines between the entity 110d and the entities 110b and 110e). For example, if the entity 110d declares bankruptcy, the entity 110a would lose a revenue stream from the entity 110d (e.g., the repayment of a debt) and may lose revenue streams from the entities 110b and 110e if the bankruptcy of from the entity 110d negatively impacts the ability of the entities 110b and 110e to uphold financial obligations to the entity 110a.

In some aspects, the interconnectivity evaluation module 101 may generate analytics or recommendations that can assist the entity 110a in reducing the risk involved with entering or maintaining the business relationship with the entity 110d. In one example, the interconnectivity evaluation module 101 may generate and transmit a message to the entity 110a suggesting that the entity 110a should reject a request by the entity 110d to borrow money, should limit the total financial obligation of the entity 110d to the entity 110a (e.g., by loaning no more than a threshold amount of money to the entity 110d), or should take some other action that would address the risk indicated by the interconnectivity score for the entity 110d. The entity 110a may respond to the suggestion by, for example, rejecting a loan request from the entity 110d or limiting an amount of a loan to the entity 110d. In another example, if the contemplated business relationship involves the entity 110d being a product supplier to the entity 110a, the interconnectivity evaluation module 101 may identify alternative suppliers having connectivity scores with respect to the entities 110b and 110e that are lower than the connectivity score of the entity 110d with respect to the entities 110b and 110e. The interconnectivity evaluation module 101 may generate and transmit a message to the entity 110a suggesting that the entity 110a should select one or more of the alternative suppliers. The entity 110a may respond to the suggestion by selecting one or more of the suggested alternative suppliers.

Figure 10:
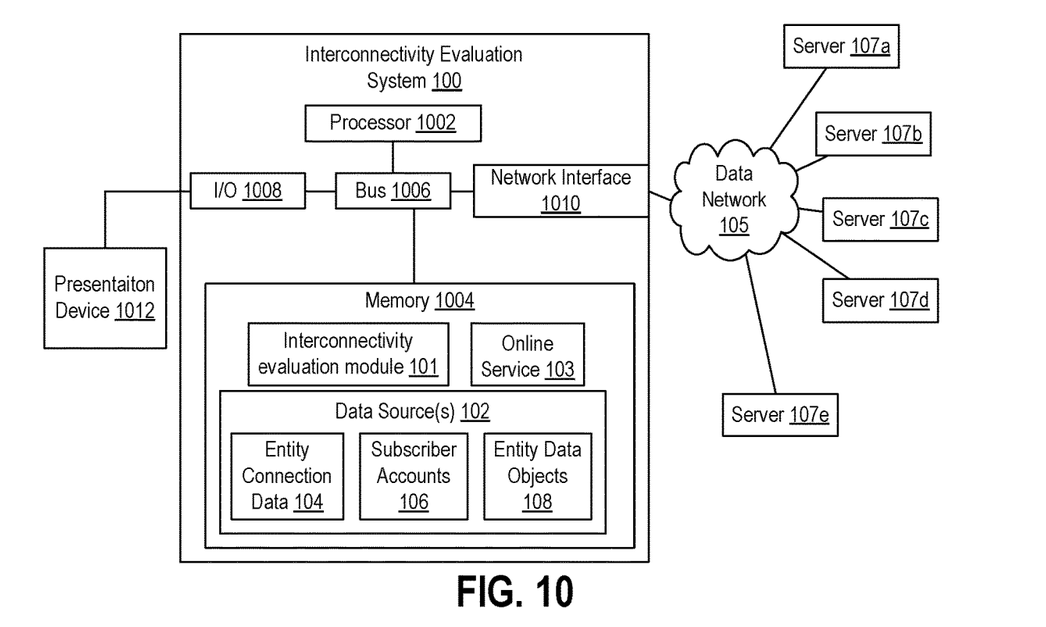
FIG. 10 depicts an example of a computing system for implementing certain features, according to some aspects of the present disclosure.

Any suitable computing system or group of computing systems can be used to perform the operations described herein. For example, FIG. 10 is a block diagram depicting an example of an interconnectivity evaluation system 100 for implementing certain features according to some aspects.

The interconnectivity evaluation system 100 can include a processor 1002 that is communicatively coupled to a memory 1004 and that executes computer-executable program code stored in the memory 1004, accesses information stored in the memory 1004, or both. Examples of a processor 1002 include a microprocessor, an application-specific integrated circuit, a field-programmable gate array, or any other suitable processing device. The processor 1002 can include any number of processing devices, including one. The processor 1002 can include or communicate with a memory 1004 storing program code that, when executed by the processor 1002, causes the processor to perform the operations described in this disclosure.

The memory 1004 can include any suitable computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The interconnectivity evaluation system 100 may also include a number of external or internal devices such as input or output devices. For example, the interconnectivity evaluation system 100 is shown with an input/output interface 1008 that can receive input from input devices or provide output to output devices. A bus 1006 can also be included in the interconnectivity evaluation system 100. The bus 1006 can communicatively couple one or more components of the interconnectivity evaluation system 100.

The interconnectivity evaluation system 100 can execute program code that includes the interconnectivity evaluation module 101. The program code for the interconnectivity evaluation module 101 may be resident in any suitable computer-readable medium and may be executed on any suitable processing device. The program code for the interconnectivity evaluation module 101 can reside in the memory 1004 at the interconnectivity evaluation system 100. The interconnectivity evaluation module 101 stored in the memory 1004 can configure the processor 1002 to perform the operations described herein.

The interconnectivity evaluation system 100 can include one or more output devices. One example of an output device is the network interface device 1010 depicted in FIG. 10. A network interface device 1010 can include any device or group of devices suitable for establishing a wired or wireless data connection to one or more data networks 105. Non-limiting examples of the network interface device 1010 include an Ethernet network adapter, a modem, etc. Another example of an output device is the presentation device 1012 depicted in FIG. 10. A presentation device 1012 can include any device or group of devices suitable for providing visual, auditory, or other suitable sensory output indicating recommendations generated by the interconnectivity evaluation module 101. Non-limiting examples of the presentation device 1012 include a touchscreen, a monitor, a speaker, a separate mobile computing device, etc.

General Considerations

Numerous specific details are set forth herein to provide a thorough understanding of the claimed subject matter. But those skilled in the art will understand that the claimed subject matter may be practiced without these specific details. Certain methods, apparatuses, or systems that would be known by one of ordinary skill have not been described in detail so as not to obscure claimed subject matter. Those skilled in the art, upon attaining an understanding of the foregoing, may produce alterations to, variations of, and equivalents to aspects described herein. Any aspects or examples may be combined with any other aspects or examples.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable program coding, scripting, or other type of language or combinations of languages may be used to implement the teachings contained herein in software to be used in programming or configuring a computing device. Though aspects of the methods disclosed herein may be performed in the operation of such computing devices, the order of the blocks in the examples can be varied (e.g., re-ordered, combined, broken into sub-blocks, performed in parallel, etc.).

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Accordingly, this disclosure has been presented for purposes of example rather than limitation, and does not preclude inclusion of modifications, variations, or additions to the present subject matter as would be readily apparent to one of ordinary skill in the art.

The invention claimed is:

1. An interconnectivity evaluation system comprising:
   a processing device communicatively coupled via a data network to external servers associated with entities represented by entity data objects, wherein each entity data object includes data indicating at least one link with another entity data object; and
   a non-transitory computer-readable medium storing a data structure having the entity data objects and entity connection data, the entity connection data describing transactions among entities represented by the entity data objects;
   wherein the processing device is configured for:
      generating, in the data structure and based on the entity connection data, links among the entity data objects,
      identifying, from the data structure, first links between a first entity data object, representing a first entity, and additional entity data objects and second links between a second entity data object, representing a second entity, and the additional entity data objects,
      computing, based on the first links and the second links, a connectivity score for the first entity data object and the second entity data object to indicate a derived relationship between the first entity data object and the second entity data object, the derived relationship comprising an indirect relationship between the first entity data object and the second entity data object, the connectivity score indicating a weight of the derived relationship between the first entity data object and the second entity data object,
      modifying data in the data structure to indicate the indirect relationship between the first entity data object and the second entity data object and a direct relationship between the first entity data object and the second entity data object determined based on the entity connection data, the derived relationship associated with the connectivity score,
      determining that a difference between the connectivity score and a desired connectivity score exceeds a threshold,
      computing an additional connectivity score indicating an additional weight of an additional derived relationship between the first entity data object and a third entity data object representing a third entity,
      determining that the additional connectivity score is lower than the connectivity score,
      receiving, via the data network and from a computing device, a query regarding connectivity among one or more of the first entity, the second entity, and the third entity, and,
      servicing the query by at least:
         (a) generating, based on the difference between the connectivity score and the desired connectivity score exceeding a threshold and further based on the additional connectivity score being lower than the connectivity score, a recommendation to modify the connectivity score by forming a relationship between the first entity and the third entity, and
         (b) instructing, based on the difference between the connectivity score and the desired connectivity score exceeding the threshold, an output device to electronically output the recommendation to modify the connectivity score; and
      wherein the output device is communicatively coupled to the processing device and configured for outputting the recommendation to the computing device via the data network.

2. The interconnectivity evaluation system of claim 1, wherein the processing device is configured for computing the connectivity score by performing operations comprising:
   computing a ratio of (i) a number of links between the first entity data object and the second entity data object and (ii) a total number of links involving the first entity data object;
   computing a weighted sum of additional ratios between (i) numbers of links between the first entity data object and each of the additional entity data objects and (ii) the total number of links involving the first entity data object, wherein a respective weight for each additional ratio is computed from a first respective connectivity score for the first entity data object with respect to a respective additional entity data object and a second respective connectivity score for the respective additional entity data object with respect to the second entity data object; and
   summing the ratio and the weighted sum of additional ratios.

3. The interconnectivity evaluation system of claim 1, wherein the recommendation indicates a replacement of a link involving the second entity data object with a link involving the third entity data object.

4. The interconnectivity evaluation system of claim 1, wherein the processing device is further configured to perform operations comprising:
   computing a third connectivity score between the first entity data object and a fourth entity data object, wherein the third connectivity score indicates a third weight of a third relationship between the first entity data object and the fourth entity data object, wherein the third connectivity score is computed based on the first links and fourth links between the fourth entity data object and the additional entity data objects;

determining that a difference between the third connectivity score and an additional desired connectivity score is less than an additional threshold; and instructing, based on the difference between the third connectivity score and the additional desired connectivity score being less than the additional threshold, the output device to output an additional recommendation indicating an establishment of a link between the first entity data object and the fourth entity data object.

5. The interconnectivity evaluation system of claim 1, wherein the processing device is further configured to perform operations comprising:

identifying a fourth entity data object with which the first entity data object has no links;

computing a third connectivity score between the first entity data object and the fourth entity data object, wherein the third connectivity score indicates a third weight of a third relationship between the first entity data object and the fourth entity data object, wherein the third connectivity score is computed based on the first links and fourth links between the fourth entity data object and the additional entity data objects;

determining that a difference between the third connectivity score and an additional desired connectivity score exceeds an additional threshold; and instructing, based on the difference between the third connectivity score and the additional desired connectivity score exceeding the additional threshold, the output device to output an additional recommendation indicating an avoidance of establishing a link with the fourth entity data object.

6. The interconnectivity evaluation system of claim 1, wherein the processing device is further configured for performing additional operations prior to identifying the first links and the second links, the first links, and the second links, the additional operations comprising:

establishing subscriber accounts for at least one of the first entity data object, the second entity data object, and the additional entity data objects;

authenticating users associated with the subscriber accounts;

receiving information from the authenticated users describing the entities; and generating the entity data objects and entity connection data based on the received information.

7. The interconnectivity evaluation system of claim 1, wherein each link indicates at least one of a creditor-debtor relationship, a provision of banking services, a supplier-buyer relationship, a relationship involving a provision of investment services, or a relationship involving a provision of manufacturing services.

8. A method comprising:

identifying, in a data structure identifying links among entity data objects, first links between a first entity data object, representing a first entity, and additional entity data objects and second links between a second entity data object, representing a second entity, and the additional entity data objects, computing, by a processing device and based on the first links and the second links, a connectivity score for the first entity data object and the second entity data object to indicate a derived relationship between the first entity data object and the second entity data object, the derived relationship comprising an indirect relationship between the first entity data object and the second entity data object the connectivity score indicating a weight of the derived relationship between the first entity data object and the second entity data object;

modifying, by the processing device, data in the data structure to indicate the indirect relationship between the first entity data object and the second entity data object and a direct relationship between the first entity data object and the second entity data object determined based on the links among entity data objects, the derived relationship associated with the connectivity score;

determining that a difference between the connectivity score and a desired connectivity score exceeds a threshold;

computing an additional connectivity score indicating an additional weight of an additional derived relationship between the first entity data object and a third entity data object representing a third entity;

determining that the additional connectivity score is lower than the connectivity score;

generating, based on the difference between the connectivity score and the desired connectivity score exceeding a threshold and further based on the additional connectivity score being lower than the connectivity score, a recommendation to modify the connectivity score by forming a relationship between the first entity and the third entity; and outputting, via an output device and based on the difference between the connectivity score and the desired connectivity score exceeding the threshold, the recommendation to modify the connectivity score.

9. The method of claim 8, wherein computing the connectivity score comprises:

computing a ratio of (i) a number of links between the first entity data object and the second entity data object and (ii) a total number of links involving the first entity data object;

computing a weighted sum of additional ratios between (i) numbers of links between the first entity data object and each of the additional entity data objects and (ii) the total number of links involving the first entity data object, wherein a respective weight for each additional ratio is computed from a first respective connectivity score for the first entity data object with respect to a respective additional entity data object and a second respective connectivity score for the respective additional entity data object with respect to the second entity data object; and summing the ratio and the weighted sum of additional ratios.

10. The method of claim 8, wherein the recommendation indicates a replacement of a link involving the second entity data object with a link involving the third entity data object.

11. The method of claim 8, further comprising:

computing a third connectivity score between the first entity data object and a fourth entity data object, wherein the third connectivity score indicates a third weight of a third relationship between the first entity data object and the fourth entity data object, wherein the third connectivity score is computed based on the first links and fourth links between the fourth entity data object and the additional entity data objects;

determining that a difference between the third connectivity score and an additional desired connectivity score is less than an additional threshold; and instructing, based on the difference between the third connectivity score and the additional desired connectivity score being less than the additional threshold, the output device to output an additional recommendation indicating an establishment of a link between the first entity data object and the fourth entity data object.

12. The method of claim 8, further comprising:

identifying a fourth entity data object with which the first entity data object has no links;

computing a third connectivity score between the first entity data object and the fourth entity data object, wherein the third connectivity score indicates a third weight of a third relationship between the first entity data object and the fourth entity data object, wherein the third connectivity score is computed based on the first links and fourth links between the fourth entity data object and the additional entity data objects;

determining that a difference between the third connectivity score and an additional desired connectivity score exceeds an additional threshold; and instructing, based on the difference between the third connectivity score and the additional desired connectivity score exceeding the additional threshold, the output device to output an additional recommendation indicating an avoidance of establishing a link with the fourth entity data object.

13. The method of claim 8, further comprising:

establishing subscriber accounts for at least one of the first entity data object, the second entity data object, and the additional entity data objects;

authenticating users associated with the subscriber accounts;

receiving information from the authenticated users describing the entities; and generating the entity data objects and entity connection data based on the received information prior to identifying the first links and the second links.

14. The method of claim 8, wherein each link indicates at least one of a creditor-debtor relationship, a provision of banking services, a supplier-buyer relationship, a relationship involving a provision of investment services, or a relationship involving a provision of manufacturing services.

15. A non-transitory computer-readable medium having program code that is executable by a processing device to cause a computing device to perform operations, the operations comprising:

identifying, in a data structure identifying links among entity data objects, first links between a first entity data object, representing a first entity, and additional entity data objects and second links between a second entity data object, representing a second entity, and the additional entity data objects, computing, based on the first links and the second links, a connectivity score for the first entity data object and the second entity data object to indicate a derived relationship between the first entity data object and the second entity data object, the derived relationship comprising an indirect relationship between the first entity data object and the second entity data object, the connectivity score indicating a weight of the derived relationship between the first entity data object and the second entity data object;

modifying data in the data structure to indicate the indirect relationship between the first entity data object and the second entity data object and a direct relationship between the first entity data object and the second entity data object determined based on the links among entity data objects, the derived relationship associated with the connectivity score;

determining that a difference between the connectivity score and a desired connectivity score exceeds a threshold;

computing an additional connectivity score indicating an additional weight of an additional derived relationship between the first entity data object and a third entity data object representing a third entity;

determining that the additional connectivity score is lower than the connectivity score;

generating, based on the difference between the connectivity score and the desired connectivity score exceeding a threshold and further based on the additional connectivity score being lower than the connectivity score, a recommendation to modify the connectivity score by forming a relationship between the first entity and the third entity; and configuring, based on the connectivity score exceeding the threshold, an output device to output the recommendation to modify the connectivity score.

16. The non-transitory computer-readable medium of claim 15, wherein computing the connectivity score comprises:

computing a ratio of (i) a number of links between the first entity data object and the second entity data object and (ii) a total number of links involving the first entity data object;

computing a weighted sum of additional ratios between (i) numbers of links between the first entity data object and each of the additional entity data objects and (ii) the total number of links involving the first entity data object, wherein a respective weight for each additional ratio is computed from a first respective connectivity score for the first entity data object with respect to a respective additional entity data object and a second respective connectivity score for the respective additional entity data object with respect to the second entity data object; and summing the ratio and the weighted sum of additional ratios.

17. The non-transitory computer-readable medium of claim 15, wherein the recommendation indicates a replacement of a link involving the second entity data object with a link involving the third entity data object.

18. The non-transitory computer-readable medium of claim 15, the operations further comprising:

computing a third connectivity score between the first entity data object and a fourth entity data object, wherein the third connectivity score indicates a third weight of a third relationship between the first entity data object and the fourth entity data object, wherein the third connectivity score is computed based on the first links and fourth links between the fourth entity data object and the additional entity data objects;

determining that a difference between the third connectivity score and an additional desired connectivity score is less than an additional threshold; and instructing, based on the difference between the third connectivity score and the additional desired connectivity score being less than the additional threshold, the output device to output an additional recommendation indicating an establishment of a link between the first entity data object and the fourth entity data object.

19. The non-transitory computer-readable medium of claim 15, the operations further comprising:
   identifying a fourth entity data object with which the first entity data object has no links;
   computing a third connectivity score between the first entity data object and the fourth entity data object, wherein the third connectivity score indicates a third weight of a third relationship between the first entity data object and the fourth entity data object, wherein the third connectivity score is computed based on the first links and fourth links between the fourth entity data object and the additional entity data objects;
   determining that a difference between the third connectivity score and an additional desired connectivity score exceeds an additional threshold; and
   instructing, based on the difference between the third connectivity score and the additional desired connectivity score exceeding the additional threshold, the output device to output an additional recommendation indicating an avoidance of establishing a link with the fourth entity data object.

20. The non-transitory computer-readable medium of claim 15, the operations further comprising, prior to identifying the first links and the second links:
   establishing subscriber accounts for at least one of the first entity data object, the second entity data object, and the additional entity data objects;
   authenticating users associated with the subscriber accounts;
   receiving information from the authenticated users describing the entities; and
   generating the entity data objects and entity connection data based on the information.

* * * * *